Patented June 29, 1954

2,682,550

UNITED STATES PATENT OFFICE 2,682,550

SOLVENT TREATMENT

Harland H. Young, Western Springs, and Howard C. Black, Chicago, Ill., assignors to Swift & Company, Chicago, Ill., a corporation of Illinois No Drawing. Original application December 7, 1944, Serial No. 567,126. Divided and this application April 7, 1951, Serial No. 219,894

18 Claims. (Cl. 260—410.7)

This invention relates to the fractionation of fatty esters and has to do more particularly with the separation of glycerides of higher fatty acids into fractions of varying degrees of saturation and melting point by solvent treatment. The invention involves the purification and fractionation of various esters of polyhydric alcohols; for example, glyceride oils including triglycerides and partial glycerides, such as mono- and diglycerides. The invention has particular application to the treatment of both animal and vegetable fats; for example, the destearinating of animal fats such as white and yellow grease to produce stearine and grease oil, the purification and separation of mono- and diglycerides from mixtures of mono-, di-, and triglycerides, and the separation of glycerides from the fatty esters of higher monohydric alcohols such as occur in sperm oil.

Naturally occurring glycerides are made up of components of varying degrees of saturation and melting point. In order to have maximum utility it is at times desirable to separate fractions of like degrees of saturation and melting point from the original mixture. The common method used in the past for accomplishing this separation has been the so-called seeding in which the melted fatty material is slowly chilled. The more saturated portions crystallize and are separated by a straining or pressing operation. Solvent fractionation has been proposed as a means for separating the more saturated from the less saturated fractions, but experience has shown that as sharp a separation as desired is not obtained. A sharp separation can be obtained if the fatty material is dissolved in a solvent and chilled until the higher melting point constituents crystallize. The solid material is then filtered off and washed with fresh chilled solvent.

By dissolving the fatty material in a solvent, generally at an elevated temperature, and cooling the mixture gradually, a fraction precipitates which consists of the higher melting, more saturated constituents. If the cooling and separation are carried out properly the fraction which separates is quite uniform in degree of saturation and melting point and consists of products of quite similar chemical constitution and physical properties. After the solid precipitate has been removed, further cooling of the filtrate results in the separation of a further fraction which is somewhat less saturated and of slightly lower melting point than the original precipitate. The filtration and cooling steps may be continued to yield any number of fractions, each with different melting point and degree of saturation. If the process is carried out carefully, quite sharp separation can generally be obtained. If further degree of separation is desired, any of the fractions can be redissolved in a portion of the solvent or another solvent and rechilled and filtered in a manner similar to the original chilling and filtering. By repetition of this process fractions of high degree of uniformity and purity can be produced.

Polyhydric alcohol partial esters, particularly fatty acid monoglycerides, are employed in many ways and for different purposes because of their surface activity, compatibility with numerous materials, and other desirable physical and chemical properties. In recent years many methods have been described for the preparation and use of these polyhydric alcohol partial esters. In general, however, these procedures do not produce simple mixtures of monoglycerides, but instead they usually form compositions containing in addition to the monoglycerides some diglycerides and triglycerides, as well as other organic and inorganic impurities. Among the methods disclosed in prior patents is that of Kapp, U. S. Patent No. 2,207,257, wherein a mixture of fatty acid mono-, di-, and triglycerides is extracted from soaps of the corresponding fatty acids. The resulting product is, as stated hereinbefore, a mixture of materials, some of which are not desired.

It is an object of this invention to prepare purer and more uniform fractions of esters of polyhydric alcohols including polyhydric alcohol partial esters.

Another object of this invention is to separate mixtures of fatty acid glycerides into uniform fractions, each possessing different physical and chemical properties.

Another object of the invention is to provide an improved process for separating glyceride esters and esters of other polyhydric alcohols by fractional crystallization.

Another object of this invention is to produce relatively pure fractions of fatty acid partial esters having uniform unsaturation, solubility, stability, surface activity and other desirable properties.

An additional object is to provide an economical process for solvent-extracting fatty acid monoglycerides in order to purify said materials.

A further object of the invention is to provide improved solvents for separating fatty acid glycerides by solvent crystallization.

A further object of the invention is to produce relatively pure fractions of fatty acid partial glycerides having uniform unsaturation, solubility, stability, surface activity, and other desirable properties.

The present invention contemplates broadly the dissolving of the ester material in a suitable solvent, then reducing the temperature of the solution to separate fractions of esters, and separating the fractions so separated. One method is to form a solution of a mixture of esters in a crystallization solvent having a differential solubility for the various components of the mixture, utilizing sufficiently high temperatures to completely dissolve the oil, chilling the solution to separate the desired fraction as crystals, and then separating the crystals from the remaining solution by suitable means such as filtration or gravity separation. Generally, when a solution of the fatty material and a solvent is chilled or when an anti-solvent is added, the material which first precipitates is the higher melting, more saturated fraction. As the temperature is further reduced, the less saturated, lower melting point fractions begin to precipitate. By controlling the amount of solvent and the temperature, any desired number of fractions may be separated.

The present invention may be used for separating various types of glyceride fats including triglyceride, diglyceride, monoglyceride or mixtures thereof. Also the invention can be applied to the separation of the fatty acid esters of other polyhydric alcohols such as ethylene glycol, propylene glycol, erythritol, diethylene glycol and the like. These may be either completely esterified esters or partial esters. It may also be applied to separation of the fatty esters of monohydric alcohols such as occur in the common waxes; for example, beeswax and spermaceti.

The broad principles of the present invention may be applied to any of the aforementioned materials, although the specific details of the invention may have to be varied depending on the species of the material treated. In practicing the invention it is desirable to use conditions most favorable to the particular solvent being employed. Thus the temperature and the solvent ratio may have to be varied depending on the method of treatment. The temperature of operation will depend mainly on the type of solvent, the proportion of solvent, and the material under treatment. The solvents are ordinarily more selective at lower temperatures, but the quantity of material dissolved is usually lower; hence, it is a question of balancing the degree of separation against the quantity of solvent required. In general, it is necessary to use only sufficient temperatures to obtain solution of the oil in the solvent. Usually these temperatures will be within the range of about room temperature (about 70° F.) to about 200° F. The proportion of solvent to ester material under treatment will usually be within a range of about 1 part to 15 parts by volume of solvent to 1 part of oil. For simple single-stage crystallizations a proportion of about ½ to 5 parts of solvent to 1 part of ester material is satisfactory, and preferably about 1–3.

One aspect of the present invention comprises the purification and/or fractionation of partial esters of aliphatic polyhydroxy substances occurring in mixtures containing these materials by solvent extraction with a selective solvent. It has been found that when certain polar solvents are contacted with mixtures containing partial esters of aliphatic polyhydroxy substances, there is a greater tendency to dissolve the polyhydroxy substances having the lower number of ester substitutions than those more fully esterified, and the more unsaturated derivatives than the more saturated ones. By this means the applicants can extract concentrated monoglycerides from mixtures containing di- and triglycerides, and/or to separate monoglycerides into unsaturated and saturated fractions. The polar solvent is employed in such proportions and under such conditions that two phases are formed; one, a solution of the aliphatic polyhydroxy substances having a larger number of free hydroxyl groups; and the other, an insoluble or at least partially immiscible phase containing some impurities and more fully esterified polyhydroxy compounds. One method is to operate so that two liquid phases are formed; in other words, to employ liquid-liquid extraction.

When employing liquid-liquid extraction it is within the scope of this invention to employ continuous counter-current extraction (in a tower), multiple-stage counter-current extraction (mixing and settling), or one or more stages of batch extraction (mixing and settling). In any of these procedures one or more miscible polar solvents may be used to effect controlled and/or maximum fractionation. In addition, it may be advantageous to use one or more immiscible non-polar solvents in conjunction with the polar solvent or solvents in order to set up an opposed solubilizing action on the more fully esterified polyhydroxy substances when using polar materials possessing very high solvent action or when operating on mixtures of partial esters which have many solubilizing groups, such as olefine linkages or hydroxy radicals. It is also a feature of this invention to employ miscible non-polar solvents or miscible anti-solvents along with the polar solvents in order to improve or reduce, i. e., control, the solvent properties on the materials which are not desired to be extracted. For example, water-saturated solvents are in many cases more selective than the corresponding anhydrous materials. In other cases a highly effective but non-selective miscible solvent may be added to a very selective solvent to increase the yield.

In operating this process it is possible to employ temperatures and proportions which yield immiscible liquids at all times. This is the case in the preferred method of operating in a continuous counter-current manner. The procedure in this type of operation usually is to flow the mixture containing partial esters of polyhydric alcohols, with or without non-polar solvents, such as petroleum ether, into a vertical tower near the bottom or at any point substantially below the top thereof. Simultaneously, a polar solvent is introduced into the tower near the top. If desired, the tower may be equipped with packing, baffles, plates and/or heating units to vary or control the temperature throughout the extraction. The denser solvent flows downwardly through the column counter-current to the rising mixture of aliphatic polyhydroxy derivatives. An interface will be formed at one point in the tower between the lower downwardly flowing solvent phase through which the partial esters rise in the form of drops or the like, and the upper rising extracted partial ester phase through which falls the fresh solvent. This interface is usually midway between the two inlet ports but may be nearer to either of them, depending on the characteristics of the material under treatment and the extractant. It is also desirable to have a separating zone below the lower and above the upper entrance ports for the materials to be counter-currently treated in order to permit complete separation of the immiscible phases. For effecting maximum concentration it is another feature of this invention to separate the solvent from the extract and to return a portion of the extracted material to the tower at a point near the bottom but below the entrance port of the original mixture undergoing extraction. By this process of reflux it is possible to even further concentrate and purify the less highly substituted polyhydroxy partial ester. With solvents, such as alcohol, having a lower density than the oil, the oil is introduced near the top and the solvent near the bottom.

The above outlined procedure can be also conducted in a counter-current, multi-stage manner including the reflux feature. In such operation the solvent is flowed into the last of a series of batch treating stages and the mixture to be purified is introduced into the first, or into an intermediate stage if reflux is to be employed. The raffinate from each stage moves progressively toward the last stage and the extract from each stage moves progressively toward the first stage. When employing reflux, the extract from the first stage is separated from its solvent and a substantial portion of the purified solvent-free extract of less fully esterified material is returned as the charge to the first stage. In each of these stages the raffinate from the previous stage and the extract from the following stage are intimately mixed for a substantial period. The mixture is then permitted to settle and the two layers are separately drawn off, one representing the raffinate charge to the following stage, and the other representing extract charge to the next previous stage. The raffinate from the last stage comprises the more fully esterified and more saturated polyhydroxy derivatives.

Another procedure involves concurrent extraction by flowing the material to be extracted in a mixture with the polar solvent through a zone wherein the conditions are such that the materials are miscible; for example, higher temperatures and/or higher proportions of solvents. The materials are held in this condition for a sufficient time to effect uniformity of solution; for example, by flowing through a pipe of relatively small cross-section and tortuous path. After complete mixing, the mixture is treated so that incipient stratification (turbidity) takes place; for example, by cooling the mixture, by evaporation, or by addition of an immiscible, non-polar solvent (e. g., hydrocarbon) or a miscible non-solvent (e. g., water). The material in this turbid state is subjected to centrifugal action in order to effect separation of the suspended matter, i. e., the material causing turbidity. This process may involve the simultaneous stratification and separation during the centrifugal treatment. It is also possible to cool or precipitate by other means to an extent that immiscible layers are formed, but the preferred procedure involves the centrifugal action because of the more rapid separation effected.

Of course, simple batch extracting in a single or a plurality of stages, each employing fresh solvent, can be used, but this is not generally employed in commercial operation because of the higher cost and poorer yields involved.

The process, as stated hereinbefore, is directed to the liquid-liquid extraction of the partial ester mixture. Such procedures may also include operations wherein a solid phase is formed in addition to the two liquid phases. In other words, a double purification is effected by separation of the three phases.

The processes involving solid-liquid extraction may be conducted in the following manner, among other methods:

A solid, plastic composition of partial esters may be admixed with a polar solvent at a temperature below that at which the composition becomes liquid. After the composition has been intimately mixed with the solvent, the insoluble extracted portion is separated by means of centrifuging, filtering and/or decanting. The liquid extract is treated to remove the solvent which may be returned for extracting additional composition under treatment. The material removed from the solvent is a fraction of polyhydroxy material of lower degree of substitution. The process may be repeated in one or more stages employing the same or different solvents or mixtures of solvents.

Other methods include the complete dissolution of the mixture in the polar solvent or solvents with or without miscible non-polar solvents and non-solvents at higher temperatures followed by the fractional precipitation or crystallization of the polyhydroxy material having a higher degree of substitution from the solution by lowering the temperature and/or by addition of a miscible non-solvent. The separated material may be removed by centrifuging, filtering and/or decanting. This is similar to a procedure outlined for liquid-liquid extraction, but temperatures are employed at which the separated material is solid rather than liquid.

It is possible, according to the invention, to remove water and dissolved salts or alkali from the compositions containing the partial esters by means of polar solvents. The addition of a water-immiscible polar solvent or solvent combination will cause aqueous material to separate to a major extent from the resulting solution of partial esters of polyhydric alcohols. This separation may be effected under conditions that total miscibility of the solvent and ester composition results or under conditions that fractionation takes place. Non-polar solvents in conjunction with the polar solvents are also effective for this purpose. When employing polar solvents, miscible wholly or partially with water, it is possible to cause water separation by the addition of salts of inorganic acids or of low molecular weight organic acids such as sodium chloride, sodium sulfate, sodium phosphate, sodium carbonate, sodium borate, sodium acetate or the corresponding ammonium or other alkali metal salts. An immiscible aqueous salt solution or salt layer will separate out, and if any inorganic salts and other water-soluble impurities are present these will probably be removed too. Hence the process is not only one of fractionation, but also involves simultaneous purification and extraction from other materials.

The source of the partial esters is immaterial and they may be prepared by any of the methods described in the numerous patents and literature articles. Because of the various sources many different types of admixed agents and impurities are separated by the present process. Among the methods for preparing the materials which may be purified by the method of the present invention are those described in Christensen, U. S. Patent No. 2,022,494; Edeler et al., U. S. Patents No. 2,206,167 and No. 2,206,168; Kapp, U. S. Patent No. 2,207,251; Oelverwertung, Austrian Patent No. 67,061; and Jurgens, German Patent No. 277,641. This list is merely by way of illustration and the present process is not limited to the purification of the agents prepared by the above processes but may be applied to those prepared by any process. The method is effective not only for separating monoglycerides, diglycerides and triglycerides, but also for fractionating mixtures containing one or more of the following materials: mono-aliphatic acid esters of ethylene glycol, of diethylene glycol, of diethylene thioglycol, of triethylene glycol, of 1,4 butylene glycol, of 1,2 propylene glycol, of 1,2 pentandiol, of glycerol chlorhydrin, of glyceric acid, of N-diethanolacetamide, of 1,6 hexandiol, and of other glycols; mono- and di-organic monocarboxylic acid esters of glycerol, of beta methyl glycerol, of 1,2,5 pentantriol, and of other trihydric alcohols; mono-, di-, tri- and higher partial esters of erythritol, hexitols, hexoses, and related materials. The acids esterified with the polyhydric alcohol may be any of the organic monocarboxylic acids having at least six carbon atoms, such as caproic acid, n-heptoic acid, caprylic acid, n-nonoic acid, capric acid, n-undecenoic acid, lauric acid, tridecanoic acid, myristic acid, palmitic acid, palmitoleic acid, elaeostearic acid, margaric acid, stearic acid, elaidic acid, dichlorstearic acid, oleic acid, linoleic acid, linolenic acid, eicosanoic acid, behenic acid, recinoleic acid, cerotic acid, melissic acid, acids from oxidized petroleum, naphthenic acid, abietic acid and/or other monocarboxylic acid, whether cyclic branched or straight chain, saturated or unsaturated, substituted or unsubstituted, or mixtures thereof, such as are obtained from coconut oil, tallow, peanut oil, cottonseed oil, marine oils, palm oil, olive oil, whale oil, linseed oil, lard oil caster oil, tung oil, eleo oil, spermaceti, beeswax, corn oil, menhaden oil, perilla oil, oiticica oil, soybean oil, tall oil, and their halogenated and hydrogenated products. The partial ester may be a mixture of the same fatty acid esterified to different degrees with different polyhydric alcohols and/or different fatty acids with the same polyhydric alcohol. In most cases it will be a mixture of partial fatty acids of the same polyhydric alcohol, for example monoglycerides and higher glycerides of fatty acids prepared by reacting glycerine with coconut oil or other fatty oils or fats in the presence of an alkaline catalyst.

The extraction solvents which may be employed in the present invention are non-reactive polar solvents, preferably organic. Among these solvents are the lower alkyl esters of phosphoric acid. It is essential that the properties of these materials and the temperatures employed should be such that two phases are formed and that the solvents are not reactive under the treatment conditions. Miscible polar solvents which do not meet the above requirement and also miscible nonpolar solvents may be used in conjunction with the selective polar solvents to be employed in the present process in order to alter the solubility of certain of the constituents under treatment. Likewise, it is possible to increase the selectivity of the process by employing non-miscible nonpolar solvents which tend to hold the more fully esterified materials while the polar solvent extracts the less fully esterified more hydrophyllic material.

Among the polar solvents which may be employed for the present purposes are trimethylphosphate and triethylphosphate.

The temperature of operation as indicated hereinbefore will depend mainly on the method of treatment, the type of solvent, the proportion of solvent, and the material under treatment. In general, the solvents are more selective at lower temperatures but the quantity of material dissolved is usually lower; hence it is a question of balancing the degree of separation against the quantity of solvent necessary. When liquid-liquid extraction is the desired method, of course a low temperature limit is set by the temperature of solidification of one or both of the phases. A high temperature limit is similarly fixed in most cases by the fact that the polar solvents will either become completely miscible with the total ester mixture under treatment or will dissolve abnormally large quantities of all constituents in the ester mixture. The proportion of solvent to ester material under treatment will usually be within a range of about 1 part to 15 parts by volume of solvent to 1 part of oil. For simple single-stage extractions a proportion of about 3 to 5 parts of solvent to 1 part of ester material is satisfactory. In counter-current extraction it is, of course, possible to employ smaller quantities of solvent to effect an equivalent purification.

The ester material may be recovered from the solvent solution by crystallization, vacuum distillation, flash distillation, and precipitation by the addition of non-solvents such as water. For large scale production it is desirable to recover the solvents for return to the process in the treatment of fresh materials.

The fractional crystallization or precipitation of the partial esters from the extract solution has the additional merit of removing substances which in many cases have a deleterious action in the extracted product. In some cases these materials will precipitate first from the solvent solution, but in general it has been found that they are among the last materials to be precipitated or crystallized from the extracting solvent. Hence by the processes of this invention it is possible not only to fractionate and purify the partial esters, but also to effect an improvement in color, taste and odor, and the stability of the product in resistance to reversion in these properties.

The fractionation and purification process may be performed in a single unit with a single solvent, but in many cases there are advantages in operating in several extracting steps of the same type or different types with the same or different solvent or solvents; for example, one solvent may be effective for concentrating the esters of aliphatic polyhydroxy substances of lower degree of substitution when these materials are present in small percentages, but the same solvent may be much less selective when the concentration of the constituent to be extracted is present in higher proportions. On the other hand, another solvent may have a directly opposite change of selectivity; that is, be more effective in concentrated mixtures than on dilute mixtures. Hence, when starting with a material having a low content of slightly esterified materials, the first stage of extraction would be with the former solvent, and the extract of the solvent from the first stage of extraction could then be extracted in a second stage with the latter solvent. In another case, the first stage of extraction may be one involving simple or concurrent mixing and settling to remove a small or large proportion of the constituents of the material under treatment followed by a counter-current extraction of the solvent-free extract and/or of the raffinate from this first stage of extraction. As another variation, it is possible to obtain an extract of a mixture containing esters of aliphatic polyhydroxy substances in a polar solvent and then to extract this solution by any method, preferably continuous counter-current extraction with an immiscible solvent, such as gasoline, petroleum ether or other nonpolar solvents. Any combination of solvents or mixtures of solvents and/or of methods disclosed herein may be employed in the present process. By "nonreactive" solvents it is meant to include solvents which do not react with the hydroxy substituted derivatives under the conditions of treatment.

The fractions obtained by these extraction procedures, with or without the solvents present, may be treated with adsorbent agents, such as activated carbon, bauxite, kieselguhr, silica gel and clay, alkali or other purifying agents to yield final products of unusually high purity. Although the above description has been directed to the treatment of partial esters of polyhydroxy compounds, it is likewise applicable to the fractionation and purification of organic acid amides of aminoalcohols, such as monoethanolamine, diethanolamine, trihydroxy methyl aminomethane, monoglycerolamine, diglycerolamine, and the like. That is, the process is applicable to the esters or amides having free hydroxy groups. The products of the present process may be used wherever the corresponding nonpurified full and partial esters and/or amides have previously been employed. The agents having free hydroxy groups are exceptionally satisfactory for use as emulsifying agents for emulsifying or for other surface-active purposes. The agents are unusually effective in food preparation, such as ice cream, shortening, peanut butter, and the like, because of their greater efficiency, their purity and their greater resistance to reversion. The full esters are likewise improved in color, odor, taste and stability and may be used in foods, lubricants, soap manufacture, manufacture of partial esters, and organic synthesis. The partial esters by themselves possess surface active properties, but for particular purposes these purified compounds may be reacted with inorganic polybasic acids to form the corresponding partial esters thereof, which, when neutralized, are highly desirable surface-active agents possessing deterging, emulsifying, penetrating and wetting properties.

Another aspect of the invention involves the separation of esters of polyhydric alcohols by solvent crystallization. According to this method the product to be treated is dissolved in the solvent at an elevated temperature and the mixture cooled to precipitate or crystallize fractions of varying degree of saturation and melting point. The fractions crystallized may then be separated from the solvent by suitable means such as filtration. By reducing the temperature in carefully controlled intervals a plurality of fractions of similar chemical and physical properties may be produced. The crystallization method is particularly applicable to the treatment of full esters such as triglycerides, but it may be applied to the separation of partial esters or mixtures of full and partial esters by properly selecting the solvent or mixtures of solvents. When products containing two or more compounds of the group of monoglycerides, diglycerides and triglycerides are treated, the order of crystallization from polar solvents is usually triglycerides, then diglycerides and then monoglycerides. In general, the same order applies also to other partial esters. When treating a product comprising essentially full esters as distinguished from partial esters, for example, triglycerides as distinguished from monoglycerides and diglycerides, the order of crystallization is usually according to the degree of saturation and melting point, i. e., the more saturated and higher melting point components crystallize first.

The crystallization method differs from the liquid-liquid phase operation in that the separation according to the degree of unsaturation is not so pronounced in the crystallization method. On the other hand the crystallization method gives sharper separation according to the melting point and completeness of saturation and length of carbon chain, whereas the liquid-liquid phase extraction tends to make a separation between the unsaturated and saturated fractions. It is not possible by such method to obtain a sharp separation between products of the same length of carbon chain.

In the solvent liquid-liquid extraction operation the separation is made on differences in degree of polarity of the compounds to be separated. Within the class of fatty materials the degree of polarity varies only over a rather narrow range, and it is, therefore, difficult to make a sharp separation. On the other hand, in the solvent crystallization process the separation is made on the basis of the difference in melting point and solubility of the various fatty materials. The melting point varies over quite a wide range, and it is therefore possible to make quite sharp separations if the proper conditions are chosen.

The melting point of the fatty material effects the degree of solubility to a greater extent than does the degree of unsaturation. It is, therefore, possible to make a more marked separation on the basis of melting point than on the basis of unsaturation.

To illustrate, attempts have been made to separate fatty materials on the basis of unsaturation by means of solvent crystallization. However, the degree of solubility between the saturated and unsaturated constituents is not sufficiently different to make sharp separations and only a limited number of cuts can be made. On the other hand when the separation is made on the basis of melting point where large differences exist in the degree of solubility, a large number of cuts can be made, each possessing widely different melting points.

In the solvent crystallization process the degree of separation on the basis of melting point can be controlled to some extent by the method in which the process is carried out. If the crystallization is carried out rapidly, causing a quick crystallization of the higher melting point constituents, some of the lower melting constituents are likely to be adsorbed or occluded on the crystals, thereby causing a lesser degree of final separation. However, if the crystallization is carried out slowly, and if the solvent ratio and temperature are adjusted, the adsorption and occlusion are held at a minimum. Further, if the crystals are well formed and granular they can be washed with cold solvent, washing away from them the lower melting point constituents which are adsorbed, resulting in a separation which is considerably sharper.

In the solvent extraction process such control is not possible. Further, the crystallization process when applied in a manner to obtain separation on the basis of melting point as contrasted to that intended to cause separation on the basis of unsaturation is more easily controlled in that the crystals are more readily formed and less occlusion takes place, resulting in a sharper separation.

The solvents used are organic phosphates, preferably lower alkyl esters of phosphoric acid.

Examples of organic phosphates are ethyl phosphate, diethyl phosphate, propyl phosphate, dipropyl phosphate, butyl phosphate, dibutyl phosphate, ethyl-butyl phosphate, ethyl propyl phosphate, propyl butyl phosphate, triethylphosphate, tripropylphosphate and tributylphosphate.

It may be desirable in some cases to use mixtures of two or more of the above solvents.

Instead of chilling the mixture of solvent and ester of polyhydric alcohol in order to cause crystallization, an antisolvent may be added. The antisolvent is a material in which fats are insoluble or only slightly soluble. They may be polar, low molecular weight compounds. The most common are water and the lower aliphatic alcohols such as methyl and ethyl alcohol. The temperature at which they are used will vary, depending upon the fat solvent which is used, and the type of fatty material which is in solution. At times it is advantageous to use a combination of cooling and the antisolvent. It is generally necessary to add the antisolvent rather slowly and with quite rapid agitation in order to produce a precipitate which is crystalline and easily filterable.

In practicing the invention the fat and crystallization solvent may be fed in properly proportioned amounts to a chiller wherein the mixture is chilled to cause separation of crystallized fractions. The chilled mixture may be mixed with additional cold solvent and the product subjected to filtration in a rotary continuous type of filter in which the solid material is removed as a filter cake on a segmented rotating drum. The filter cake may be washed by a portion of the cold solvent and the used wash solvent may be reused in the system; for example, by mixing it with the charge to the filter. The solvent may be stripped from the filter cake and the filtrate in suitable strippers.

Generally, the softer the fatty material used, the smaller the amount of the solvent required to cause complete solution at elevated temperatures. As the melting point of the original fatty material increases, more solvent is necessary in order to obtain complete solution. Generally, for the common fatty materials, such as inedible greases and soybean oil from one-half to five volumes and preferably one to three volumes of solvent to one volume of oil suffices. However, with the more saturated higher melting point fatty materials such as tallow and substantially completely hydrogenated fats or oils considerably more solvent may be necessary, for example up to ten volumes of solvent to one of fat.

When using an auxiliary solvent in the separation of mono-, di- and triglycerides the temperature at which the triglycerides separate is below their melting point, and therefore they crystallize in well-formed crystals. However, if the auxiliary solvent is not employed, separation of the triglyceride material is at a temperature which is generally above the melting point of the triglyceride material, and it therefore remains as an oil.

Separation of oils generally gives a less sharp degree of separation than when crystals separate. Nevertheless, the separation of the triglyceride material as an oil when the auxiliary solvent is not employed is quite pure, and if the proper means are available for separating the oil from the solution, fairly good separation is obtained.

The separation of crystals is much easier to accomplish on a practical scale than is the separation of oily materials. The crystals can be washed with pure solvent, resulting in a sharper degree of separation.

If the ratio of solvent to the mixture of mono-, di- and triglycerides is controlled so that the triglycerides separate at a temperature below their melting point, then crystallization will be obtained. The latter will require considerably more solvent than in the case where the oily material separates, and it is necessary to carry out the chilling at a slower rate.

Fatty materials crystallize from the lower alkyl esters of phosphoric acid in well-formed, easily filterable crystals. Both the partial and fully esterified esters of polyhydric alcohols are soluble in the organic phosphates. With the ordinary fats such as cottonseed oil, greases, and lard, one-half to five volumes of solvent per volume of fatty material is sufficient. If the fatty material is of high melting point, more solvent may be required up to ten volumes or more. Temperatures from room temperature (70° F.) to 200° F. are sufficient to obtain complete solution. Crystallization takes place at room temperature to 0° F., depending on the amount of ester and the melting point of the fatty material.

*Example I*

Glycerinated hydrogenated cottonseed oil of iodine number of about 80 was dissolved in two volumes of ethyl phosphate and the mixture was cooled to 35° F. The solid material which separated was filtered and washed with cold ethyl phosphate. The solvent was removed by vacuum distillation and iodine values determined on the filtrate and precipitate. The precipitate had an iodine value of about 84, and the filtrate an iodine value of about 77. The precipitate consisted essentially of completely esterified glycerol esters and made up about 20 per cent of the original charge.

*Example II*

An equal volume mixture of white grease and propyl phosphate was made at 100° F. and the solution cooled to 40° F. The solid material which separated was filtered by means of a vacuum and washed with cold solvent. The precipitate had a titer of about 109° F. and the filtrate a melting point of 40° F. The precipitate contained about 22 per cent of the original grease and consisted essentially of the glycerides of the higher melting fatty acids of the grease.

*Example III*

Refined soybean oil of iodine value of 130 was dissolved in one volume of butyl phosphate and the solution cooled to about 35° F. The precipitate after filtration and removal of solvent had an iodine value of about 120, and the filtrate an iodine value of about 135 after removal of the solvent. The precipitate contained about 40 per cent of the original oil and consisted of the higher melting glycerides.

The ester material may be recovered from the solvent solution by crystallization, vacuum distillation, flash distillation, or precipitation by the addition of non-solvents such as water. For large scale production it is desirable to recover the solvents for return to the process in the treatment of fresh materials.

The fractional crystallization or precipitation of the esters from the solution may be used to remove substances which in many cases have a deleterious action in the product. In some cases these materials may be precipitated first from the solvent solution, or they may be among the last materials to be precipitated or crystallized from the heating solvent. Hence, by the processes of this invention it is possible not only to fractionate and purify the esters, but also to effect an improvement in color, taste and odor, and the stability of the product in resistance to reversion in these properties.

The color, flavor, stability and reversion causing materials in fats is due to the presence of compounds of quite different chemical nature from the fats themselves. Their solubilities are also different, and by the use of the proper solvent and temperature it is possible to separate them from the fatty materials. For example, the compounds in soybean oil which cause reversion may be separated from the oil by converting the hydrogenated oil to monoglycerides and crystallizing the monoglycerides from ethyl alcohol. The monoglycerides are precipitated and the reversion causing materials remain in solution. The color of animal fatty materials, such as tallows and greases, is due to the presence of pigments and decomposition products of the fats and their animal tissues. These foreign materials and decomposition products may be separated from the fatty materials by crystallization of the fats from suitable solvents. The foreign material and decomposition products have different solubilities than the fats and, therefore, may be separated under proper conditions.

In the cases where the color-forming bodies are less soluble than the fats, they precipitate at a higher temperature than the fats. However, in most cases the color-forming bodies are more soluble than the fats and remain in solution after the fats have been precipitated. An example of the latter is the separation of the colors of soybean oil by crystallization from acetone. If soybean oil is dissolved in acetone and repeatedly crystallized, a water-white oil is finally obtained and the color remains in the solvent.

The fractions obtained by crystallization with or without the solvents present may be treated with adsorbent agents such as activated carbon, bauxite, kieselguhr, silica gel, and clay, alkali or other purifying agents to yield final products of unusually high purity.

Obviously, many modifications and variations of the invention hereinbefore set forth may be made without distinguishing from the spirit and scope thereof, and therefore only such limitations should be imposed as are indicated in the appended claims.

This application is a divisional application of applicants' co-pending application Serial No. 567,126, filed December 7, 1944, now Patent No. 2,553,288, which, in turn, is a continuation-in-part of Serial No. 378,063, filed February 8, 1941, now abandoned, which in turn is a continuation-in-part of Serial No. 267,906, filed April 14, 1939, now Patent No. 2,308,848.

We claim:

1. The method of purifying monoglycerides formed by superglycerinating refined fats to separate therefrom materials tending to cause reversion of flavor and odor, which comprises treating the monoglycerides with a lower alkyl ester of phosphoric acid at a temperature such that a single phase is formed, reducing the temperature sufficiently to cause the product to separate into two phases, one of said phases containing monoglycerides and the other of said phases containing the reversion causing materials, and recovering the monoglycerides from the first-mentioned phase.

2. The method of purifying monoglycerides formed by superglycerinating refined fatty acid triglycerides to separate therefrom impurities tending to cause reversion of flavor and odor, which comprises treating the monoglycerides with a lower alkyl ester of phosphoric acid at a temperature sufficiently high to cause the monoglycerides and said impurities to dissolve in the said phosphoric ester, cooling the solution to precipitate the monoglycerides, and separating said precipitate from the solution of impurities.

3. The method of purifying monoglycerides formed by superglycerinating refined vegetable fats to remove materials tending to cause flavor and odor reversion, which comprises treating the unpurified monoglycerides with a lower alkyl ester of phosphoric acid under conditions such that the monoglycerides and flavor and odor reversion causing materials are dissolved in the said phosphoric ester, cooling the resulting solution to crystallize the monoglycerides relatively free from reversion causing materials, and separating the crystallized monoglycerides from the solution.

4. The method of purifying partial glycerides formed by superglycerinating refined fats to separate therefrom materials tending to cause reversion of flavor and odor, which comprises treating the superglycerinated refined fat containing substantial amounts of the partial glycerides with a lower alkyl ester of phosphoric acid as a solvent at a temperature sufficiently high to cause the partial glycerides and reversion causing material to dissolve in the said phosphate solvent, cooling the solution to precipitate the partial glycerides, and separating said precipitate from the solution of reversion causing material.

5. A process substantially as described in claim 4 wherein the solvent is ethyl phosphate.

6. A process substantially as described in claim 4 wherein the solvent is propyl phosphate.

7. A process substantially as described in claim 4 wherein the solvent is butyl phosphate.

8. A process substantially as described in claim 4 wherein the solvent is trimethyl phosphate.

9. A process substantially as described in claim 4 wherein the solvent is triethyl phosphate.

10. A process for the manufacture of partial glyceride esters of a fatty acid which are free of flavor and odor, comprising subjecting a refined glyceride fat which has been hydrogenated and treated with glycerine to convert said fat into a mixture containing a substantial proportion of partial glycerides to solvent treatment with a lower alkyl ester of phosphoric acid at a temperature such that a single phase is formed, reducing the temperature so that two distinct phases are formed, one of said phases comprising a solution of said phosphoric ester and the material tending to cause reversion of flavor and odor, and the other phase comprising the partial glycerides, and recovering the partial glycerides free of reversion causing material.

11. A process for the manufacture of monoglyceride esters of a fatty acid which are free of flavor and odor, comprising subjecting a refined glyceride fat which has been hydrogenated and treated with glycerine to convert said fat into a mixture containing a substantial proportion of monoglycerides to solvent treatment with a lower alkyl ester of phosphoric acid as the solvent at a temperature such that a single phase is formed, reducing the temperature so that two distinct phases are formed, one of said phases comprising a solution of the phosphate solvent and the material tending to cause reversion of flavor and odor and the other phase comprising the monoglycerides free of reversion causing material, and recovering the monoglycerides free of reversion causing material.

12. A process substantially as described in claim 11 wherein the solvent is ethyl phosphate.

13. A process substantially as described in claim 11 wherein the solvent is propyl phosphate.

14. A process substantially as described in claim 11 wherein the solvent is butyl phosphate.

15. A process substantially as described in claim 11 wherein the solvent is trimethyl phosphate.

16. A process substantially as described in claim 11 wherein the solvent is triethyl phosphate.

17. A process for the separation of higher fatty acid esters of polyhydric alcohols into fractions having substantially uniform chemical and physical properties, which comprises admixing higher fatty acid esters of a polyhydric alcohol with a lower alkyl ester of phosphoric acid at a temperature correlated with the amount of said phosphoric ester to cause the formation of a distinct phase comprised predominantly of higher fatty acid esters having substantially uniform chemical and physical properties and recovering said esters free of said phosphoric ester and esters having substantially different chemical and physical properties.

18. A process for the separation of fats into fractions having substantially uniform chemical and physical properties, which comprises forming a solution of a fat with a lower alkyl ester of phosphoric acid as a solvent, cooling the said solution under controlled conditions of temperature and volume of solvent to crystallize a fraction containing fatty material of similar melting point, and separating said crystallized fraction from the said solvent and fatty material having substantially different chemical and physical properties.

References Cited in the file of this patent

Dean, Utilization of Fats, A. Harvey Pub. London, 1938, pages 118–119.